May 13, 1958 N. M. SACKS 2,834,432
LUBRICATION SYSTEM
Filed April 12, 1956

Inventor
Norman M. Sacks

Attys

United States Patent Office 2,834,432
Patented May 13, 1958

2,834,432

LUBRICATION SYSTEM

Norman M. Sacks, New York, N. Y., assignor to Thompson Products, Inc., Cleveland, Ohio, a corporation of Ohio Application April 12, 1956, Serial No. 577,887

10 Claims. (Cl. 184—6)

This invention relates to lubrication systems, and more particularly to lubrication systems adapted to operate whether in or out of the influence of gravity.

The effects of gravitational attraction sensed as weight are known to be reduced or eliminated during periods of non-resistance to gravity, i. e., during free fall, in ballistic devices and orbiting devices, and during existence outside of the field of gravitational attraction of the earth. The resulting weightlessness prevents the collection of lubricants at a low point or sump of a lubrication system, prevents the scavenging or draining of oil from such a low point, and even prevents the falling or drawing of lubricant particles to a low point.

In operations where weightlessness is encountered, therefore, lubricant-particle deposition of lubricant thrown off moving parts is non-centralized and generally unpredictable. Moreover, although gravity effects were altogether eliminated, forces of adhesion and cohesion still present would be even more significant without the factor of weight which normally acts to break up or drain off masses of lubricant flung or otherwise deposited onto casing walls; thus lubricant particles flung off the moving parts would tend to remain on casing walls and be inactive to serve a desired lubrication or cooling purpose. These and other lubrication problems encountered where effective weightlessness is a factor have been solved by the present invention.

It is accordingly one object of the present invention to provide a novel yet effective lubrication system operable independently of gravity and weight, but which will be operative also in applications where gravity is present.

Another object is to provide a new and improved lubrication system to lubricate moving parts, which will collect and carry away lubricant thrown or falling therefrom.

These and other objects, features, and advantages of the present invention will be readily apparent from the following description of an illustrative embodiment thereof, taken in conjunction with the accompanying drawings, in which.

Figure 1:
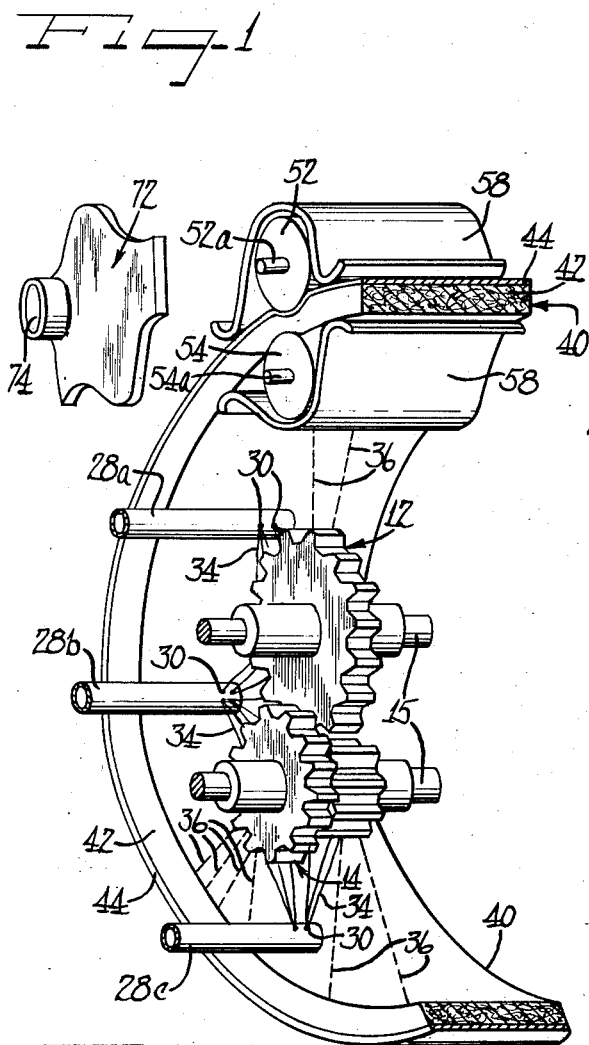
Figure 1 is a generally diagrammatical perspective view illustrating the invention in an exemplary embodiment, portions being broken away and portions being shown in section for illustrative purposes.

By way of example, a gear box 10 which encloses gears 12 and 14 carried by shafting 15 has been chosen to illustrate the invention. Such a gear box 10 is shown enclosed by a cylindrical casing wall 16 having end plates 18 and 20.

For lubricating the gears of such a device, lubricating oil is shown as pumped from an associated oil tank or supply reservoir 22 through a conduit 24 by an oil feed pump 26, through a supply conduit 28 leading to the gear box 10.

According to the present invention, a lubrication system is provided which is independent of gravitational attraction of lubricant particles, and which will both supply lubricant to the gears, collect lubricant thrown or falling from the gears, and effectuate removal of lubricant from the gear casing, as for recirculation or filtering or the like as may be desired.

Accordingly, the lubricant supply conduit is shown as provided with branches 28a—28b—28c extending through end plate 18 into the interior of the gear box casing 10. Interiorly of the casing, the supply conduits 28a—28b—28c are disposed generally adjacent the gears 12 and 14, and are provided with suitable orifices 30 or the like adapted to discharge streams 34 of lubricant toward the gears.

Lubricating oil or lubricant supplied to the rapidly moving gears eventually falls or is flung or thrown from the gears toward the casing 10, and principally toward the cylindrical wall 16 thereof, as is shown by the streams of oil indicated in broken lines 36.

The streams 36 of ejected oil impinge upon an oil-collecting member such as an endless or continuous belt 40 being formed to provide a face 42 of generally oil-absorbent material presented toward the gears. Accordingly, the belt 40 is shown as having an inner face 42 of absorbent and resilient material such as felt. For stiffening and strength purposes, the oil-absorbent face 42 is backed by a tougher or stiffer backing or reinforcing material 44, such as canvas, rubber, metal or wire or thread mesh, or other suitable material.

The belt 40 is desirably substantially wider than the thickness of the gears to collect oil thrown therefrom. As shown, belt 40 is supported about the gears 12—14 and in their general plane of rotation, but somewhat spaced from the gears 12 and 14, by carrying or idler means as by the generally Z-sectioned track members 46 shown secured to the casing wall 16.

Figure 4:
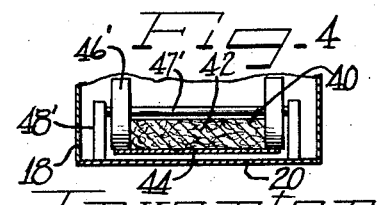
Figure 4 is a fragmental view showing alternative means for supporting the oil-collecting belt.

Alternative belt-supporting means are illustrated in Figure 4. As there shown, the backing 44 of a belt 40 may be supported and guided by idler rollers 46' shown as carried on idler shafts 47' rotatably supported as by bearings 48' mounted on the gear box wall 20.

Figure 2:
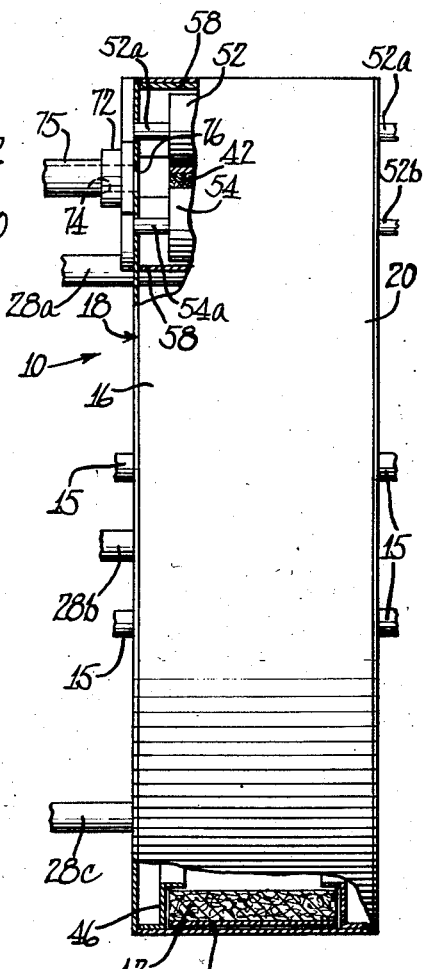
Figure 2 is a side elevational view of a gear box incorporating the form of the invention illustrated in Figure 1.
Figure 3:
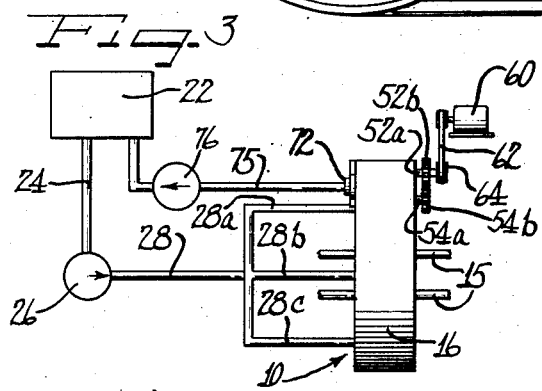
Figure 3 is a generally diagrammatic view of the gear box of Figure 2, illustrating related apparatus of the system.

Referring again to Figures 1, 2, and 3, means are provided to extract or wring the oil from the belt 40, and to drive the belt past such wringing or extracting means. In the embodiment shown, those functions are both accomplished by a wringer and driving unit shown generally near the top of the figures of the drawings. Such wringer and driving means includes a pair of rollers 52—54, the roller 52 shown as carried outwardly of the belt 40, and the roller 54 shown as carried inwardly of the belt 40 opposite the roller 52. The rollers 52 and 54 are shown carried on shafts 52a—54a, respectively, those shafts being on axes parallel to each other and perpendicular to the direction of movement of the belt 40.

Means for driving the rollers 52—54 to drive the belt are shown as comprising a motor 60 adapted to drive a belt 62 over a pulley 64 fixed on roller shaft 52a, with the roller shafts geared together by gears 52b and 54b, although other sources of roller driving power may be employed, such as power take-off from the gear box.

The belt 40 is thus caused to revolve in an endless path, bringing successive portions thereof past the wringer rolls where the oil is extracted by squeezing from the belt. Confining walls or shields 58 are carried by the gear box to confine the extracted oil in the region adjacent the rollers.

Removal of the oil thus extracted and collected is shown as effected by an outlet fitting 72 which has a bore 74 aligned with an opening 76 in the chamber end wall 18 adjacent the wringer rolls and within the confines of shields 58. The outlet fitting 72 in turn is shown as connected by conduit 75 to a scavenging pump 76. The scavenger pump 76 may force the extracted oil as desired, through suitable filters or for recirculation. In the form shown, the wringer rolls themselves also serve in a scavenger pump capacity.

A lubrication system according to the present invention thus provides desired characteristics of lubrication, and is independent of gravitational attraction and weight of the lubricant. No low point or sump is employed. In an application such as gear lubrication, where the lubricant-particle deposition and collection after use is non-centralized and generally unpredictable, the system provides a means and method for collecting the oil for return to desired scavenging means. Although the system and method are effective during conditions of weightlessness and no effective gravitational attraction, the arrangement is similarly effective under ordinary gravitational influences and effects.

It will thus be seen from the foregoing description of my invention according to an illustrative embodiment, considered in conjunction with the accompanying drawings, that the present invention provides a new and improved lubrication system having the desired characteristics and advantages, and accomplishing its intended objects, including those hereinbefore pointed out and others which are inherent in the invention as described.

It will be understood that modifications and variations may be effected without departing from the scope of the novel concepts of the present invention.

I claim as my invention:

1. Apparatus adapted to lubricate a moving mechanism in a non-gravity environment comprising a supply conduit for feeding liquid lubricant under pressure to the moving mechanism, a rotatable absorbent endless belt surrounding the moving mechanism in spaced relation thereto, means for rotating said belt, means for guiding said belt for travel in a circular path, said belt being adapted to absorb lubricant flung from the mechanism during the course of movement thereof, said rotating means being operable upon actuation to press lubricant from said belt, and means connecting said rotating means and said supply conduit for feeding the lubricant back to the moving mechanism.

2. Apparatus for lubricating a gear train in a non-gravity environment comprising a supply conduit for feeding liquid lubricant under pressure to the gear train, a rotatable absorbent endless belt surrounding the gear train in spaced relation thereto, means for rotating said belt, means for guiding said belt for travel in a circular path, said belt being adapted to absorb lubricant flung from the mechanism during the course of movement thereof, said rotating means being operable upon actuation to press lubricant from said belt, and means connecting said rotating means and said supply conduit for feeding the lubricant back to the gear train.

3. Apparatus adapted to lubricate a gear train in a non-gravity environment comprising a supply conduit for feeding liquid lubricant under pressure to the gear train, said supply conduit including a plurality of spaced branch conduits having at their free ends suitable orifices for spraying the lubricant over the gear train from different positions, a rotatable absorbent endless belt surrounding the gear train in spaced relation thereto, means for rotating said belt, means for guiding said belt for travel in a circular path, said belt being adapted to absorb lubricant flung from the mechanism during the course of movement thereof, said rotating means being operable upon actuation to press lubricant from said belt, and means connecting said rotating means and said supply conduit for feeding the lubricant back to the gear train.

4. Apparatus adapted to lubricate a gear train in a non-gravity environment comprising a supply conduit for feeding liquid lubricant under pressure to the gear train, said supply conduit including a plurality of spaced branch conduits having at their free ends suitable orifices for spraying the lubricant over the gear train from different positions, a rotatable absorbent endless belt surrounding the gear train in spaced relation thereto, means for rotating said belt, means for guiding said belt for travel in a circular path, said guide means including Z-shaped track members having portions overlying the marginal edges of the inner surface of said belt, said belt being adapted to absorb lubricant flung from the mechanism during the course of movement thereof, said rotating means being operable upon actuation to press lubricant from said belt and means connecting said rotating means and said supply conduit for feeding the lubricant back to the gear train.

5. Apparatus adapted to lubricate a moving mechanism in a non-gravity environment comprising a supply conduit for feeding liquid lubricant under pressure to the moving mechanism, a rotatable absorbent endless belt surrounding the moving mechanism in spaced relation thereto, means for rotating said belt, means for guiding said belt for travel in a circular path, said guide means including Z-shaped track members having portions overlying the marginal edges of the inner surface of said belt, said belt being adapted to absorb lubricant flung from the mechanism during the course of movement thereof, said rotating means being operable upon actuation to press lubricant from said belt, and means connecting said rotating means and said supply conduit for feeding the lubricant back to the gear train.

6. Apparatus adapted to lubricate a gear train in a non-gravity environment comprising a supply conduit for feeding liquid lubricant under pressure to the gear train, a rotatable absorbent endless belt surrounding the gear train in spaced relation thereto, means for rotating said belt, means for guiding said belt for travel in a circular path, said guide means including Z-shaped track members having portions overlying the marginal edges of the inner surface of said belt, said belt being adapted to absorb lubricant flung from the mechanism during the course of movement thereof, said rotating means being operable upon actuation to press lubricant from said belt, and means connecting said rotating means and said supply conduit for feeding the lubricant back to the gear train.

7. In power transmission apparatus having a cylindrical housing and a gear train mounted therein, the improvement comprising apparatus adapted to lubricate said gear train in a non-gravity environment, said lubricating apparatus including means for spraying lubricant onto said gear train from a plurality of spaced positions, an absorbent endless belt rotatably mounted on the inner surface of said cylindrical casing for reception of lubricant flung from said gear train, means for rotating said belt, means for guiding said belt during the course of the travel thereof, said rotating means being operative to press lubricant from said belt, and means for returning the lubricant to said gear train.

8. In power transmission apparatus having a cylindrical housing and a gear train mounted therein, the improvement comprising apparatus adapted to lubricate said gear train in a non-gravity environment, said lubricating apparatus including a supply conduit having a plurality of branches for spraying lubricant onto said gear train from a plurality of spaced positions, an absorbent endless belt rotatably mounted on the inner surface of said cylindrical casing for reception of lubricant flung from said gear train, means for rotating said belt, means for guiding said belt during the course of the travel thereof, said rotating means being operative to press lubricant from said belt, and means for returning the lubricant to said gear train.

9. In power transmission apparatus having a cylindrical housing and a gear train mounted therein, the improvement comprising apparatus adapted to lubricate said gear train in a non-gravity environment, said lubricating apparatus including means for spraying lubricant onto said gear train from a plurality of spaced positions, an absorbent endless belt rotatably mounted on the inner surface of said cylindrical casing for reception of lubricant flung from said gear train, means for rotating said belt, means for guiding said belt during the course of travel thereof, said guide means including brackets having portions overlying the marginal edges of the inner surface of said belt, said rotating means being operative to press lubricant from said belt, and means for returning the lubricant to said gear train.

10. In power transmission apparatus having a cylindrical housing and a gear train mounted therein, the improvement comprising apparatus adapted to lubricate said gear train in a non-gravity environment, said lubricating apparatus including means for spraying lubricant onto said gear train from a plurality of spaced positions, an absorbent endless belt rotatably mounted on the inner surface of said cylindrical casing for reception of lubricant flung from said gear train, means for rotating said belt, means for guiding said belt during the course of travel thereof, said guide means including a plurality of circumferentially spaced rollers operable to engage said belt, said rotating means being operative to press lubricant from said belt, and means for returning the lubricant to said gear train.

References Cited in the file of this patent

UNITED STATES PATENTS

| | | |
|---|---|---|
| 2,486,477 | Kennedy | Nov. 1, 1949 |
| 2,708,985 | Evans | May 24, 1955 |
| 2,758,461 | Tann | Aug. 14, 1956 |